US012585577B2

(12) United States Patent
Chandra et al.

(10) Patent No.: US 12,585,577 B2
(45) Date of Patent: Mar. 24, 2026

(54) RELIABILITY INDEX IN SOFTWARE TESTING

(71) Applicant: INTERNATIONAL BUSINESS MACHINES CORPORATION, Armonk, NY (US)

(72) Inventors: Vikas Chandra, Bangalore (IN); Sarika Sinha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 18/492,897

(22) Filed: Oct. 24, 2023

(65) Prior Publication Data

US 2025/0130933 A1    Apr. 24, 2025

(51) Int. Cl.
*G06F 11/3698*    (2025.01)
*G06F 11/3668*    (2025.01)

(52) U.S. Cl.
CPC ...... *G06F 11/3698* (2025.01); *G06F 11/3688* (2013.01)

(58) Field of Classification Search
None
See application file for complete search history.

(56) References Cited

U.S. PATENT DOCUMENTS 8,539,282 B1 * 9/2013 Kabanov ............. G06F 11/3688
                                                    717/124
9,311,220 B1    4/2016 Ha

| | | | |
|---|---|---|---|
| 10,152,407 | B1 * | 12/2018 | Zachesov ............. G06F 11/079 |
| 11,281,567 | B1 * | 3/2022 | Machalica ............... G06N 7/00 |
| 11,720,482 | B1 * | 8/2023 | Chauhan ............. G06F 11/3692 |
| | | | 717/124 |
| 2008/0222501 | A1 * | 9/2008 | Travison ............... G06F 11/366 |
| | | | 714/E11.207 |
| 2009/0292956 | A1 * | 11/2009 | Rivera ................ G06F 11/3688 |
| | | | 714/48 |
| 2017/0091071 | A1 * | 3/2017 | Chitale ........... G06Q 10/06375 |
| 2017/0228308 | A1 * | 8/2017 | Chan ................... G06F 11/3676 |
| 2018/0285244 | A1 * | 10/2018 | Subramanian Jayaraman ........... |
| | | | G06F 11/3692 |
| 2020/0226056 | A1 * | 7/2020 | Haubold ............. G06F 11/3688 |
| 2021/0390011 | A1 * | 12/2021 | Cser ........................ G06N 3/08 |
| 2022/0091967 | A1 * | 3/2022 | Wang .................. G06F 11/3684 |

(Continued)

OTHER PUBLICATIONS

Dagar et al., "Going beyond Conventional Software Testing: Cloud Testing," IJERA, 2012. (Year: 2012).*

(Continued)

*Primary Examiner* — Ryan D. Coyer
(74) *Attorney, Agent, or Firm* — Stosch Sabo

(57)    ABSTRACT

Described are techniques for software test reliability characterization. The techniques include receiving a test failure for a software under development in an Integrated Development Environment (IDE). The techniques further include identifying, from a software testing repository communicatively coupled to the IDE, a similar failed software test. The techniques further include applying a reliability index of the similar failed software test to the test failure. The techniques further include displaying, on a graphical user interface communicatively coupled to the IDE, a graphical illustration indicating the reliability index associated with the test failure.

20 Claims, 5 Drawing Sheets

(56) References Cited

U.S. PATENT DOCUMENTS

| | | | | |
|---|---|---|---|---|
| 2023/0185700 | A1* | 6/2023 | Wong | G06F 11/3688 |
| | | | | 714/38.1 |
| 2024/0045795 | A1* | 2/2024 | Kumar | G06F 11/324 |
| 2024/0168867 | A1* | 5/2024 | Rukletsov | G06F 11/3692 |
| 2024/0184691 | A1* | 6/2024 | Murchison | G06F 11/3688 |

OTHER PUBLICATIONS

Lam et al., "iDFlakies: A Framework for Detecting and Partially Classifying Flaky Tests," IEEE, 2019. (Year: 2019).*
Noor et al., "Studying Test Case Failure Prediction for Test Case Prioritization," ACM, 2017. (Year: 2017).*
Palma et al., "An Improvement to Test Case Failure Prediction in the Context of Test Case Prioritization," ACM, 2018. (Year: 2018).*
Johnson et al., "Causal Testing: Understanding Defects' Root Causes," ACM, 2020. (Year: 2020).*
Silva et al., "Shake It! Detecting Flaky Tests Caused by Concurrency with Shaker," IEEE, 2020. (Year: 2020).*
"Detect and track flaky Mocha tests," BuildPulse, printed from the internet Jul. 5, 2023, 9 pages.
"Flaky tests," Testomat.io, printed from the internet Jul. 5, 2023, 10 pages.
Kowalczyk et al., "Modeling and Ranking Flaky Tests at Apple," 2020IEEE/ACM 42nd International Conference on Software Engineering in Practice (ICSE-SEIP), May 23-29, 2020, pp. 110-119, Seoul, Republic of Korea.
Lam et al., "Root Causing Flaky Tests in a Large-Scale Industrial Setting," Proceedings of the 28th ACM SIGSOFT International Symposium on Software Testing and Analysis (ISSTA '19), Jul. 15-19, 2019, pp. 101-111, Beijing, China.
Machalica et al., "How do you test your tests?" Engineering at Meta, printed from the internet Jul. 5, 2023, 9 pages.
Verdecchia et al., "Know You Neighbor: Fast Static Prediction of Test Flakiness," IEEE Access, May 20, 2021, pp. 76119-76134, vol. 9, 2021.

* cited by examiner

200

202
RECEIVE A TEST RESULT FAILURE

204
STORE THE TEST RESULT FAILURE IN A TEST REPOSITORY

206
IDENTIFY A SIMILAR FAILED SOFTWARE TEST IN THE SOFTWARE TESTING REPOSITORY

208
APPLY A RELIABILITY INDEX OF THE SIMILAR FAILED SOFTWARE TEST TO THE TEST FAILURE

210
DISPLAY A GRAPHICAL ILLUSTRATION INDICATING THE RELIABILITY INDEX ASSOCIATED WITH THE TEST FAILURE

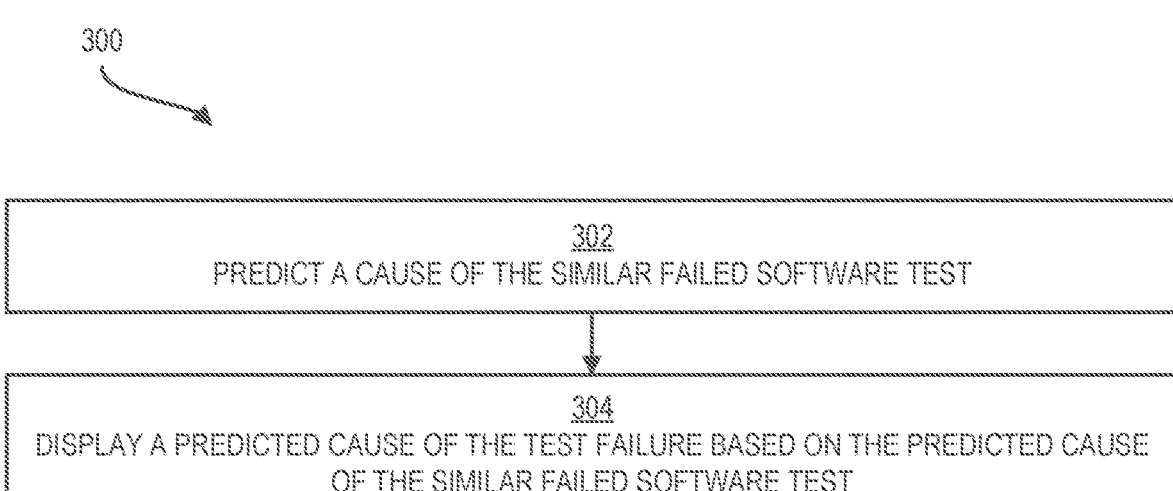

300

302
PREDICT A CAUSE OF THE SIMILAR FAILED SOFTWARE TEST

304
DISPLAY A PREDICTED CAUSE OF THE TEST FAILURE BASED ON THE PREDICTED CAUSE
OF THE SIMILAR FAILED SOFTWARE TEST

FIG. 3A

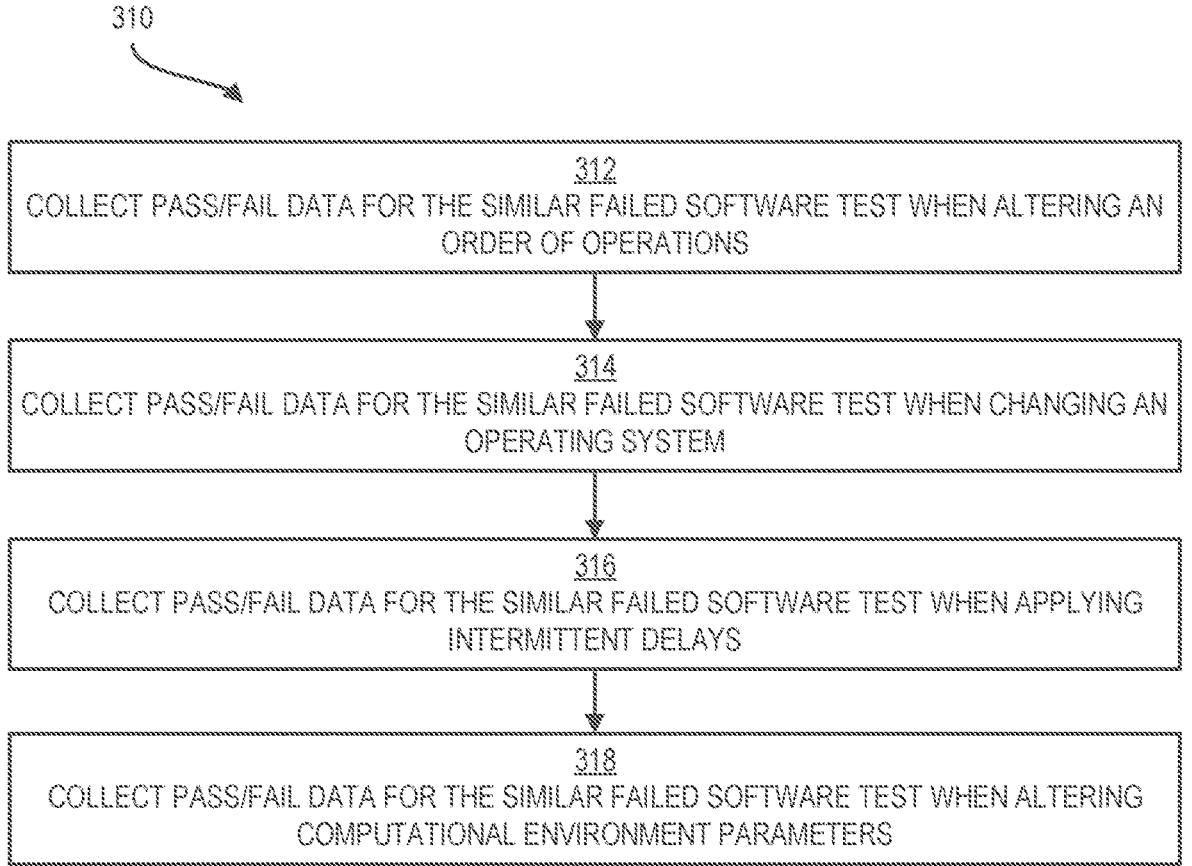

310

312
COLLECT PASS/FAIL DATA FOR THE SIMILAR FAILED SOFTWARE TEST WHEN ALTERING AN
ORDER OF OPERATIONS

314
COLLECT PASS/FAIL DATA FOR THE SIMILAR FAILED SOFTWARE TEST WHEN CHANGING AN
OPERATING SYSTEM

316
COLLECT PASS/FAIL DATA FOR THE SIMILAR FAILED SOFTWARE TEST WHEN APPLYING
INTERMITTENT DELAYS

318
COLLECT PASS/FAIL DATA FOR THE SIMILAR FAILED SOFTWARE TEST WHEN ALTERING
COMPUTATIONAL ENVIRONMENT PARAMETERS

<u>402</u>
DOWNLOAD, FROM A REMOTE DATA PROCESSING SYSTEM AND TO ONE OR MORE
COMPUTERS, SOFTWARE TEST RELIABILITY CODE

<u>404</u>
EXECUTE THE SOFTWARE TEST RELIABILITY CODE

<u>406</u>
METER USAGE OF THE SOFTWARE TEST RELIABILITY CODE

<u>408</u>
GENERATE AN INVOICE BASED ON METERING THE USAGE

500

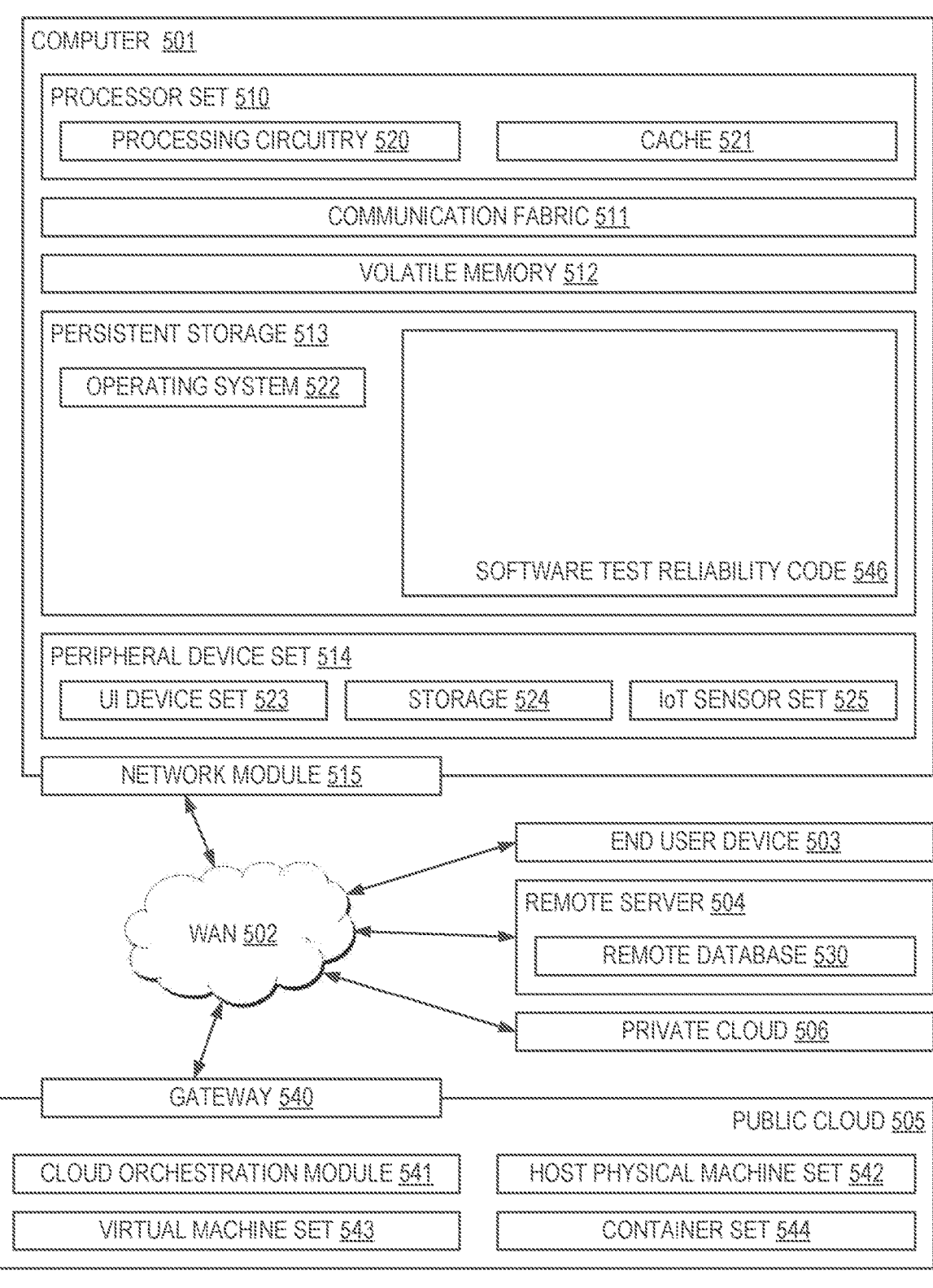

COMPUTER 501

PROCESSOR SET 510

PROCESSING CIRCUITRY 520         CACHE 521

COMMUNICATION FABRIC 511

VOLATILE MEMORY 512

PERSISTENT STORAGE 513

OPERATING SYSTEM 522

SOFTWARE TEST RELIABILITY CODE 546

PERIPHERAL DEVICE SET 514

UI DEVICE SET 523     STORAGE 524     IoT SENSOR SET 525

NETWORK MODULE 515

END USER DEVICE 503

REMOTE SERVER 504

REMOTE DATABASE 530

WAN 502

PRIVATE CLOUD 506

GATEWAY 540

PUBLIC CLOUD 505

CLOUD ORCHESTRATION MODULE 541     HOST PHYSICAL MACHINE SET 542

VIRTUAL MACHINE SET 543     CONTAINER SET 544

FIG. 5

RELIABILITY INDEX IN SOFTWARE TESTING

BACKGROUND

The present disclosure relates to software development, and, more specifically, to software testing.

Software testing is the process of evaluating the behavior of software under various execution conditions. Software testing can include static testing, dynamic testing, and/or passive testing. Static testing includes reviews, walk-throughs, or inspections of software. Dynamic testing includes executing the software code with a given set of test parameters and/or execution conditions and evaluating the execution of the code. Passive testing includes evaluating system logs and traces for patterns and/or behaviors indicative of the performance of the software.

SUMMARY

In some aspects, the techniques described herein relate to a computer-implemented method. The method includes receiving a test failure for a software under development in an Integrated Development Environment (IDE). The method further includes identifying, from a software testing repository communicatively coupled to the IDE, a similar failed software test. The method further includes applying a reliability index of the similar failed software test to the test failure. The method further includes displaying, on a graphical user interface communicatively coupled to the IDE, a graphical illustration indicating the reliability index associated with the test failure.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 3A illustrates a flowchart of an example method for predicting a cause of a failed software test, in accordance with some embodiments of the present disclosure.

FIG. 3B illustrates a flowchart of an example method for using modified tests to predict a cause of a failed software test, in accordance with some embodiments of the present disclosure.

FIG. 5 illustrates a block diagram of an example computing environment, in accordance with some embodiments of the present disclosure.

Figure 1:
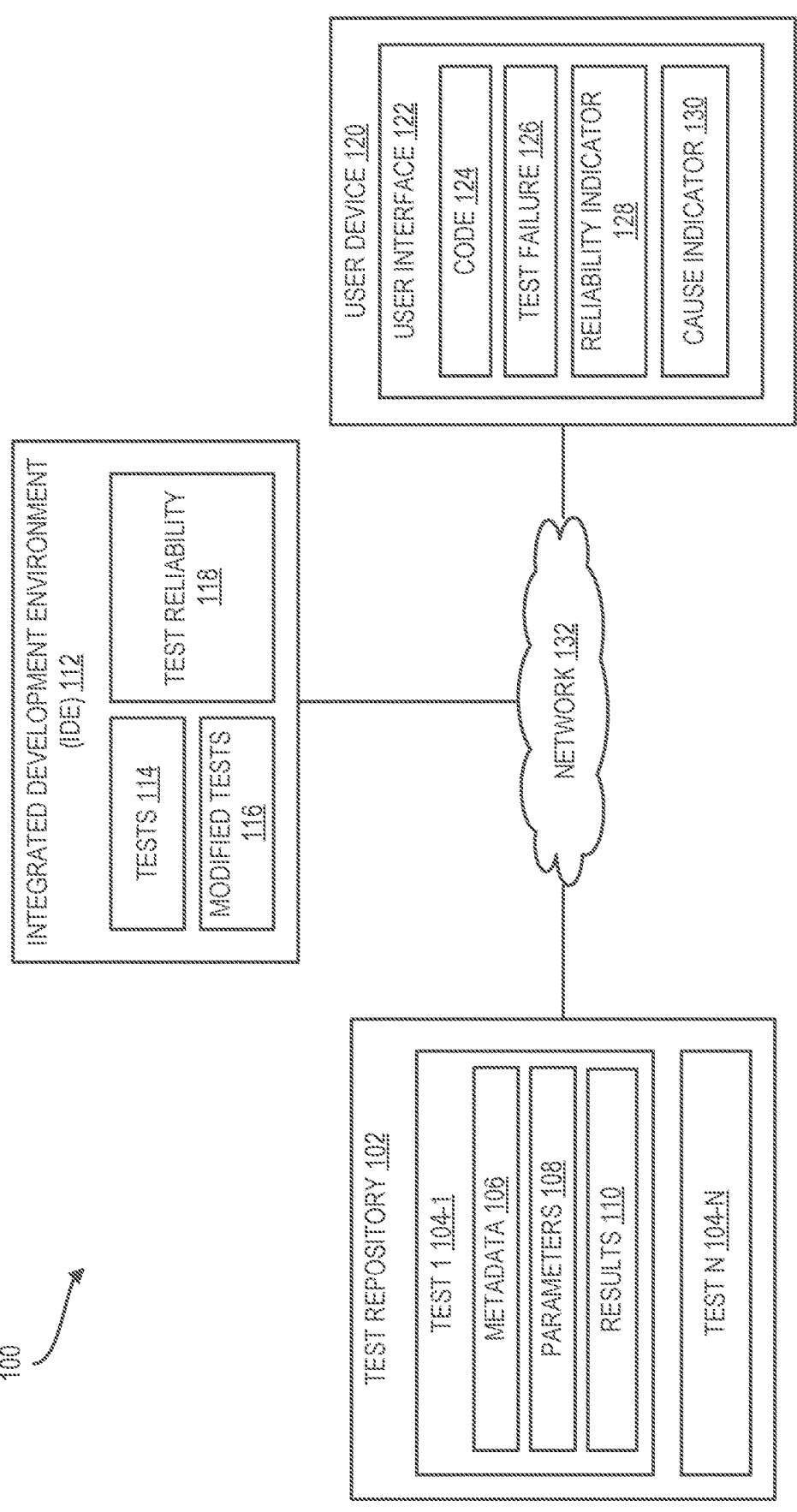
FIG. 1 illustrates a block diagram of an example system for characterizing a reliability of software tests, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward software development, and, more specifically, to software testing. While not limited to such applications, embodiments of the present disclosure may be better understood in light of the aforementioned context.

Software testing reliability can refer to the degree of consistency (or inconsistency) in results of automated software tests when there have been no changes to the code being tested. Inconsistencies in test results of the same code can be due to timing issues, computational environment conditions, test dependencies, and the like.

Unreliable software tests can create false positives (e.g., allegedly identify a code issue that does not, in fact, exist) and/or false negatives (e.g., fail to identify a code issue that does, in fact, exist). As a result, software developers can be uncertain of the validity of certain software test results. To determine if a false positive has been detected by an unreliable software test, a software developer is required to manually investigate the software test, the code, and/or search for resources (e.g., online) indicating if other software developers have experienced similar issues. To determine if a false negative has not been detected by an unreliable software test, a software developer is required to run other software tests capable of identifying the false negative using alternative mechanisms relative to the unreliable software test. Collectively, these issues cause unreliable software tests to hamper the speed and quality of software development.

Aspects of the present disclosure are directed toward techniques for (i) automatically characterizing a reliability of various software tests, (ii) predicting a reason for a failed software test result generated by executing an unreliable software test, and (iii) display the characterized reliability and/or the reason for the failed software test in a readily consumable format (e.g., within an Integrated Development Environment (IDE)). Accordingly, aspects of the present disclosure improve the speed and quality of code development by characterizing a reliability of various software tests. In this way, aspects of the present disclosure enable a software developer to quickly assess the reliability of various software tests and infer a likelihood of false positives and/or false negatives generated by the various software tests. As a result, aspects of the present disclosure additionally improve the usability of IDEs.

Referring now to the figures, FIG. 1 illustrates a block diagram of an example system 100 for characterizing a reliability of software tests, in accordance with some embodiments of the present disclosure. The system 100 includes a test repository 102 communicatively coupled to an IDE 112 and a user device 120 via a network 132. The network 132 can be a local area network (LAN), a wide area network (WAN), an intranet, the Internet, or any other network 132 or group of networks 132 capable of continuously, semi-continuously, or intermittently connecting (directly or indirectly) the aforementioned components.

The test repository 102, IDE 112, and user device 120 can be any electronic devices suitable for storing, processing, sending, and/or receiving data such as, but not limited to, computers, desktops, laptops, tablets, smartphones, servers, mainframes, and/or other configurations of hardware and/or software. The test repository 102, IDE 112, and user device 120 can be discrete physical entities or virtualized entities with underlying resources combined from disperse geographies and/or vendors.

Test repository 102 can include a plurality of tests 104 such as test 1 104-1 to test N 104-N, where N can be any integer representing several, tens, hundreds, thousands, or millions of tests 104. Test 1 104-1 is shown including metadata 106, parameters 108, and results 110. While these features are explicitly shown in test 1 104-1, they can also be included for each test 104 in the test repository 102. Metadata 106 can refer to indicators, classifications, tags, flags, and/or other information useful for characterizing test 1 104-1. In some embodiments, metadata 106 can include an indication of test reliability (e.g., test reliability 118 or reliability indicator 128) in situations where the corresponding test 1 104-1 has already been characterized for reliability. Parameters 108 can include information related to a computational environment associated with the test 1 104-1 such as, but not limited to, Operating System (OS), timing conditions, sequencing conditions, underlying hardware, peripheral software and/or firmware implemented in parallel, and the like. Results 110 can refer to output from implementing the test 1 104-1. Results 110 can be as simple as pass/fail or more nuanced to characterize a degree of success or a degree of failure.

IDE 112 can refer to any IDE now known or later developed. For example, IDE 112 can be a traditional IDE and/or a cloud-based IDE according to various embodiments. IDE 112 can be implemented as a software program executing on hardware and providing a comprehensive suite of tools for software development. Tools that may be available in IDE 112 include, but are not limited to, syntax highlighting, intelligent code completion, refactoring, version control, debugging, code search, visual programming, language support, and/or software testing.

IDE 112 can include tests 114. Tests 114 can be a suite of tests available to software developers to evaluate code 124 generated by a user device 120 utilizing in the IDE 112. Tests 114 can function at various levels of testing such as, but not limited to, unit testing, integration testing, system testing, acceptance testing, and/or other testing level. Further, tests 114 can include various types of testing such as, but not limited to, installation testing, compatibility testing, regression testing, acceptance testing, alpha testing, beta testing, function testing, non-functional testing, continuous testing, destructive testing, performance testing, usability testing, accessibility testing, security testing, development testing, A/B testing, concurrent testing, conformance testing, output comparison testing, property testing, metamorphic testing, and/or other testing types.

IDE 112 can further characterize a reliability of various tests 114 via a test reliability 118. The test reliability 118 can indicate how reliably, consistently, or otherwise predictably a same test 114 generates a same (or sufficiently similar) result when implemented on the same (or sufficiently similar) code 124. The test reliability 118 can be based on a recency of test failures, a ratio of fail to pass test cases, a frequency of test failures, and/or a duration of test failures, among other possible factors.

IDE 112 can further include modified tests 116. Modified tests 116 are versions of a test 114 that are modified, executed, and the results compared to the results of the original test 114 in order to identify a cause associated with variations in test results generated by a test 114. In some embodiments, the IDE 112 can utilize the modified tests 116 to (i) collect pass/fail data for the test 114 when altering an order of operations in test 114; (ii) collect pass/fail data for the test 114 when changing an operating system implementing the test 114; (iii) collect pass/fail data for the test 114 when applying intermittent delays during execution of the test 114; and (iv) collect pass/fail data for the test 114 when altering computational environment parameters of the test 114.

Although modified tests 116 are discussed in relation to tests 114 for purposes of generating test reliability 118, the modified tests 116 can also be utilized with tests 104 in the test repository 102 to determine a cause of false positive results in tests 104 of the test repository.

User device 120 can include a user interface 122. User interface 122 can be a graphical user interface (GUI) displaying the IDE 112. A software developer can generate code 124. The software developer can test the code 124 using a test 114. The test 114 can output a test failure 126. The IDE 112 can convey a reliability indicator 128 representing the test reliability 118 of the test 114. Additionally, the IDE 112 can output, to the user interface 122, a cause indicator 130 illustrating a predicted cause of unreliability. The cause indicator 130 can be based on information gleaned from the modified tests 116.

Figure 2:
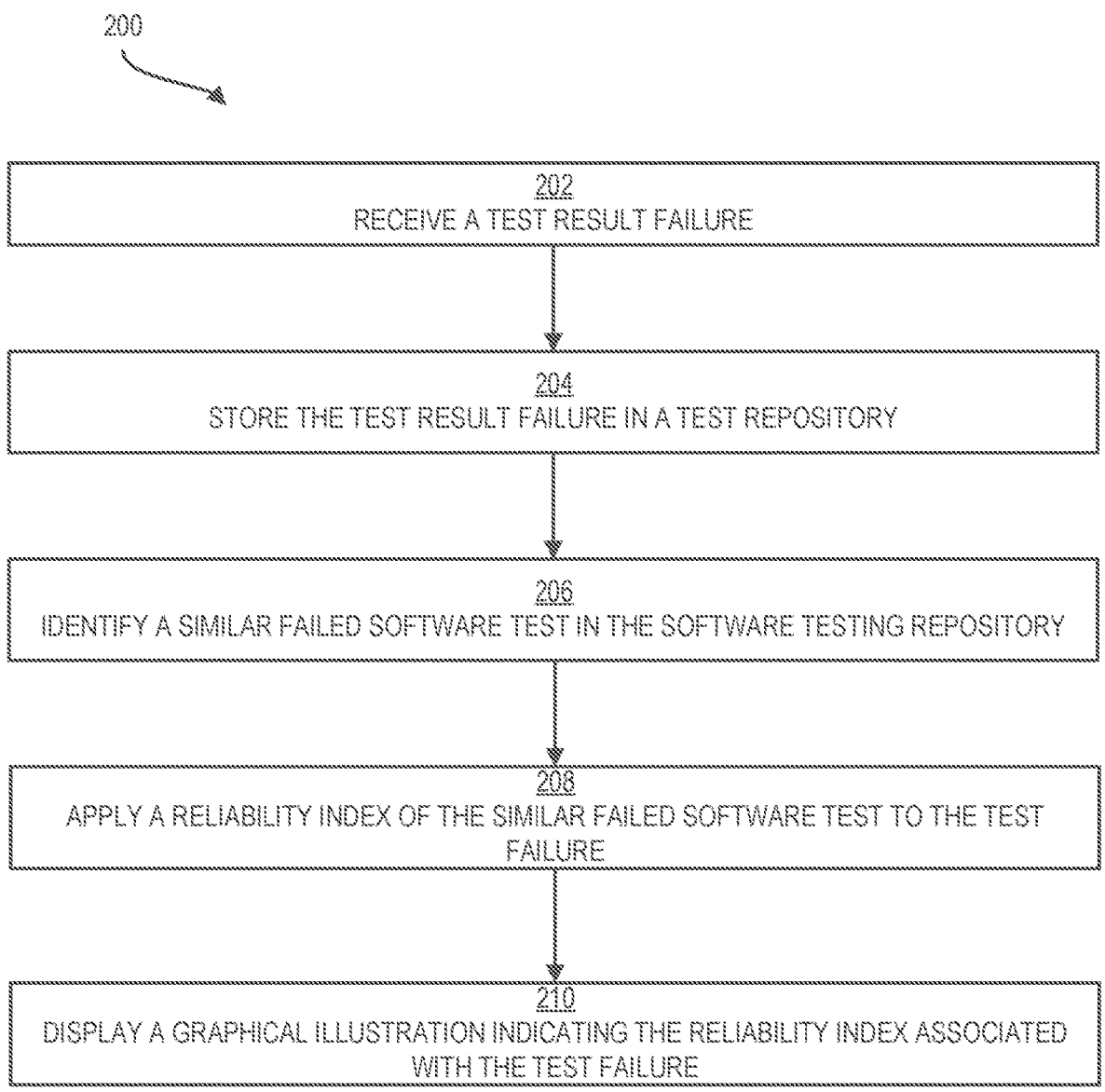
FIG. 2 illustrates a flowchart of an example method for characterizing a reliability of a software test failure, in accordance with some embodiments of the present disclosure.

FIG. 2 illustrates a flowchart of an example method 200 for characterizing a reliability of a software test failure, in accordance with some embodiments of the present disclosure. In some embodiments, the method 200 can be implemented by a one or more components of FIG. 1, a computer (e.g., computer 501 of FIG. 5), one or more processors, and/or another configuration of hardware and/or software.

Operation 202 includes receiving a test result failure. The test result failure can be generated by executing a test of an IDE against code created by a software developer. The test result failure can be a binary score (e.g., failure) or a gradient score indicating a deficiency (e.g., an imperfect score).

Operation 204 includes storing the test result failure in a test repository. The test result failure can be stored in the test repository with information such as, but not limited to, metadata, parameters, and/or results.

Operation 206 includes identifying a similar failed software test in the software testing repository. Operation 206 can identify a similar failed software test based on similarities in metadata, parameters, and/or results, for example. The similar failed software test can be a same or similar type, class, technique, or framework as the test causing the test result failure.

Operation 208 includes applying a reliability index of the similar failed software test to the test failure. The reliability index can indicate a degree of repeatability of results from the similar failed software test for similar code. A relatively inadequate reliability index (e.g., relatively lower or relatively higher depending on the framework used for characterizing reliability) can indicate that the similar failed software test can have a higher likelihood of generating false positives and/or false negatives due to differences in OS, concurrency, computational environment parameters, and the like. A relatively adequate reliability index (e.g., relatively lower or relatively higher depending on the framework used for characterizing reliability) can indicate that the similar failed software test can have a lower likelihood of generating false positives and/or false negatives despite differences in OS, concurrency, computational environment parameters, and the like.

Operation 210 includes displaying a graphical illustration indicating the reliability index associated with the test failure. The graphical illustration can be, for example, a color scheme where different colors are used to represent a gradient of reliability index scores. In other embodiments, the graphical illustration can be a symbol indicating different levels of reliability index scores. In other embodiments, the graphical illustration can include text representing different levels of reliability index scores. The graphical illustration can be displayed on a user interface (e.g., GUI) of a user device implementing an IDE for developing and testing computer programming code.

FIG. 3A illustrates a flowchart of an example method 300 for predicting a cause of a failed software test, in accordance with some embodiments of the present disclosure. In some embodiments, the method 300 can be implemented by a one or more components of FIG. 1, a computer (e.g., computer 501 of FIG. 5), one or more processors, and/or another configuration of hardware and/or software. In some embodiments, the method 300 occurs as part of one or more operations of the method 200 of FIG. 2.

Operation 302 includes predicting a cause of the similar failed software test. Operation 302 can utilize modified tests to determine a cause of inconsistent test results of a same test applied to same code. Operation 302 is discussed in more detail hereinafter with respect to FIG. 3B.

Operation 304 includes displaying a predicted cause of the test failure based on the predicted cause of the similar failed software test. In some embodiments, the predicted cause is displayed as a pie graph with different sections of the pie graph illustrating respective likelihoods of various causes of the test failure. In other embodiments, a highest predicted cause can be displayed (e.g., using symbols, text, color-coding, etc.) to succinctly indicate a most likely cause of the similar failed software test.

FIG. 3B illustrates a flowchart of an example method 310 for using modified test to predict a cause of a failed software test, in accordance with some embodiments of the present disclosure. In some embodiments, the method 310 can be implemented by a one or more components of FIG. 1, a computer (e.g., computer 501 of FIG. 5), one or more processors, and/or another configuration of hardware and/or software. In some embodiments, the method 310 is a sub-method of operation 302 of FIG. 3A.

Operation 312 includes collecting pass/fail data for the similar failed software test when altering an order of operations of the similar failed software test. Advantageously, operation 312 can be used to determine whether an order of operations influences a pass/fail rate of the similar failed software test. For example, one order of operations can cause a fault (e.g., failure), whereas another order of operations can result in a successful test result.

Operation 314 includes collecting pass/fail data for the similar failed software test when changing an OS of the similar failed software test. Advantageously, operation 314 can determine the degree to which a type of OS influences a pass/fail rate of the similar failed software test. For example, one type of OS can cause a fault (e.g., failure), whereas another type of OS can result in a successful test result.

Operation 316 includes collecting pass/fail data for the similar failed software test when applying intermittent delays to the similar failed software test. Advantageously, operation 316 can determine the degree to which timing variations (e.g., intermittent delays) influences a pass/fail rate of the similar failed software test. For example, implementing the similar failed software test without any delays could cause a fault (e.g., failure), whereas implementing the similar failed software test with one or more intermittent delays could result in a successful test result.

Operation 318 includes collecting pass/fail data for the similar failed software test when altering computational environment parameters of the similar failed software test. Advantageously, operation 318 can determine the degree to which computational environment parameters influence a pass/fail rate of the similar failed software test. For example, one set of computational environment parameters could result in a fault (e.g., failure), whereas another set of computational environment parameters could result in a successful test result.

Figure 4:
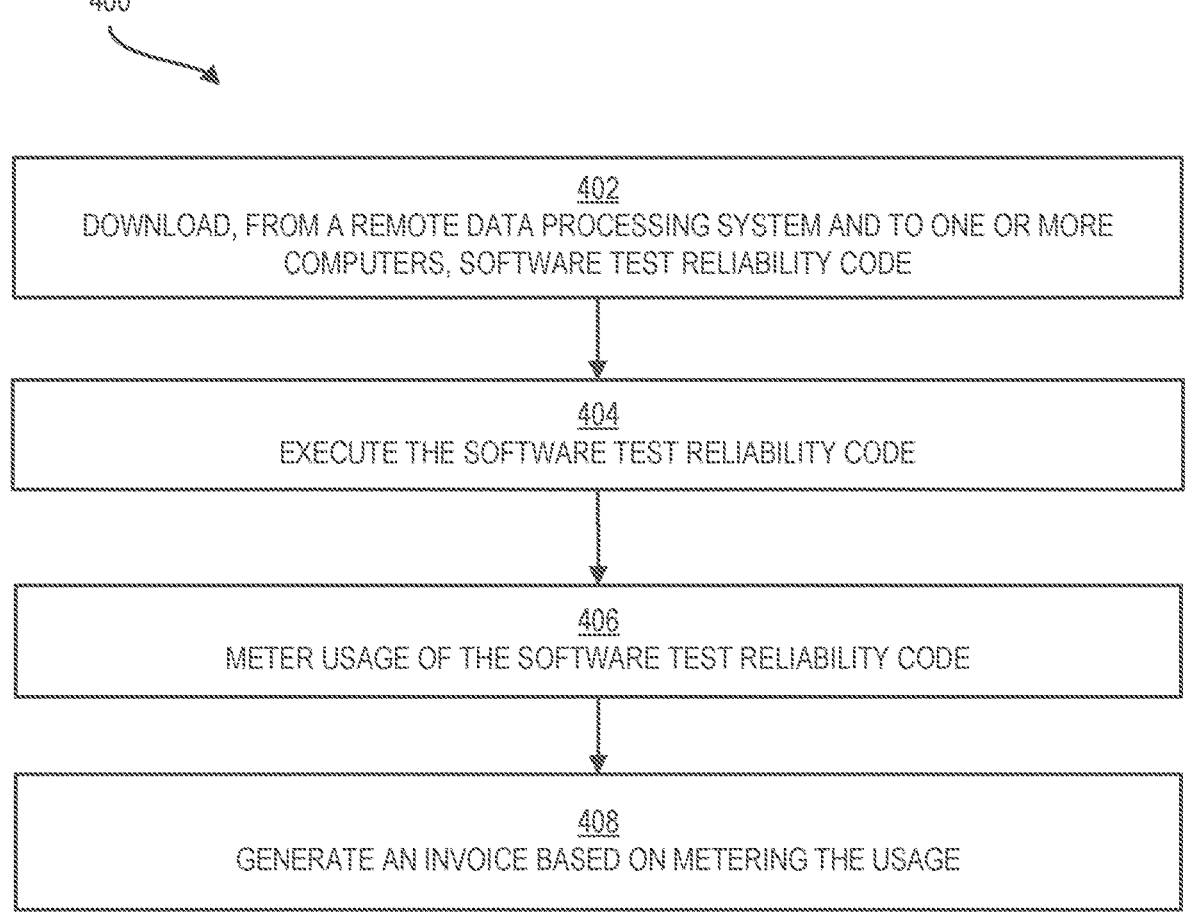
FIG. 4 illustrates a flowchart of an example method for downloading, deploying, metering, and billing usage of software test reliability code, in accordance with some embodiments of the present disclosure.

FIG. 4 illustrates a flowchart of an example method 400 for downloading, deploying, metering, and billing usage of software test reliability code, in accordance with some embodiments of the present disclosure. The method 400 can be implemented by one or more components of FIG. 1, a computer (e.g., computer 501 of FIG. 5), one or more processors, and/or another configuration of hardware and/or software. In some embodiments, the method 400 occurs contemporaneously with any of the aforementioned methods.

Operation 402 includes downloading, from a remote data processing system and to one or more computers (e.g., one or more devices of FIG. 1, computer 501 of FIG. 5, etc.) software test reliability code (e.g., software test reliability code 546 of FIG. 5). Operation 404 includes executing the software test reliability code. The executing can include performing any of the methods and/or functionalities discussed herein. Operation 406 includes metering usage of the software test reliability code. Usage can be metered by, for example, an amount of time the software test reliability code is used, a number of servers, devices, and/or nodes deploying the software test reliability code, an amount of resources consumed by implementing the software test reliability code, a number of software test results characterized by the software test reliability code, and the like. Operation 408 includes generating an invoice based on metering the usage.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 5 illustrates a block diagram of an example computing environment, in accordance with some embodiments of the present disclosure. Computing environment 500 contains an example of an environment for the execution of at least some of the computer code involved in performing the inventive methods, such as software test reliability code 546. In addition to software test reliability code 546, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and software test reliability code 546, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in software test reliability code 546 in persistent storage 513.

COMMUNICATION FABRIC 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in software test reliability code 546 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any software configured to perform any portion of the methods described previously and/or implement any of the functionalities described previously) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

The following example clauses illustrate a non-limiting listing of aspects of the present disclosure. Clause 1. A computer-implemented method comprising: receiving a test failure for a software under development in an Integrated Development Environment (IDE); identifying, from a software testing repository communicatively coupled to the IDE, a similar failed software test; applying a reliability index of the similar failed software test to the test failure; and displaying, on a graphical user interface communicatively coupled to the IDE, a graphical illustration indicating the reliability index associated with the test failure.

Clause 2. The computer-implemented method of clause 1, wherein the software testing repository includes a plurality of failed software tests each comprising a respective reliability index.

Clause 3. The computer-implemented method of clause 1, wherein the reliability index is based on a recency of test failures, a ratio of fail to pass test cases, a frequency of test failures, and a duration of test failures.

Clause 4. The computer-implemented method of clause 1, further comprising: predicting a cause of the similar failed software test by: collecting pass/fail data for the similar failed software test when altering an order of operations in the similar failed software test; collecting pass/fail data for the similar failed software test when changing an operating system implementing the similar failed software test; collecting pass/fail data for the similar failed software test when applying intermittent delays during execution of the similar failed software test; and collecting pass/fail data for the similar failed software test when altering computational environment parameters of similar failed software test.

Clause 5. The computer-implemented method of clause 4, further comprising: displaying, on the graphical user interface communicatively coupled to the IDE, a predicted cause of the test failure based on the predicted cause of the similar failed software test.

Clause 6. The computer-implemented method of clause 5, wherein the predicted cause of the test failure is selected from a group consisting of: a concurrency issue, an operating system issue, and an order of operations issue.

Clause 7. The computer-implemented method of clause 6, wherein the computer-implemented method is executed by a user device based on software test reliability code downloaded to the user device from a remote data processing system.

Clause 8. The computer-implemented method of clause 7, wherein the computer-implemented method further comprises: metering usage of the software test reliability code; and generating an invoice based on metering the usage of the software test reliability code.

Clause 9. A system comprising: one or more processors; and one or more computer-readable storage media storing program instructions which, when executed by the one or more processors, are configured to cause the one or more processors to perform a method according to any one of clauses 1 to 8.

Clause 10. A computer program product comprising one or more computer readable storage media, and program instructions collectively stored on the one or more computer readable storage media, the program instructions comprising instructions configured to cause one or more processors to perform a method according to any one of clauses 1 to 8.

What is claimed is:

1. A computer-implemented method comprising:
receiving a test failure for a software under development in an Integrated Development Environment (IDE);
identifying, from a software testing repository communicatively coupled to the IDE, a similar failed software test;
applying a reliability index of the similar failed software test to the test failure, wherein the reliability index is based on a recency of test failures, a ratio of fail to pass test cases, a frequency of test failures, and a duration of test failures;
predicting a cause of the similar failed software test by:
collecting pass/fail data for the similar failed software test when altering an order of operations in the similar failed software test;
collecting pass/fail data for the similar failed software test when changing an operating system implementing the similar failed software test;
collecting pass/fail data for the similar failed software test when applying intermittent delays during execution of the similar failed software test; and
collecting pass/fail data for the similar failed software test when altering computational environment parameters of the similar failed software test; and
displaying, on a graphical user interface communicatively coupled to the IDE, a graphical illustration indicating the reliability index associated with the test failure and a predicted cause of the test failure based on the predicted cause of the similar failed software test.

2. The computer-implemented method of claim 1, wherein the software testing repository includes a plurality of failed software tests each comprising a respective reliability index.

3. The computer-implemented method of claim 1, wherein the predicted cause of the test failure is a concurrency issue.

4. The computer-implemented method of claim 1, wherein the computer-implemented method is executed by a user device based on software test reliability code downloaded to the user device from a remote data processing system.

5. The computer-implemented method of claim 4, wherein the computer-implemented method further comprises:
metering usage of the software test reliability code; and
generating an invoice based on metering the usage of the software test reliability code.

6. A system comprising:
one or more processors; and
one or more computer-readable storage media storing program instructions which, when executed by the one or more processors, are configured to cause the one or more processors to perform a method comprising:
receiving a test failure for a software under development in an Integrated Development Environment (IDE);
identifying, from a software testing repository communicatively coupled to the IDE, a similar failed software test;
applying a reliability index of the similar failed software test to the test failure, wherein the reliability index is based on a recency of test failures, a ratio of fail to pass test cases, a frequency of test failures, and a duration of test failures;

predicting a cause of the similar failed software test by:

collecting pass/fail data for the similar failed software test when altering an order of operations in the similar failed software test;

collecting pass/fail data for the similar failed software test when changing an operating system implementing the similar failed software test;

collecting pass/fail data for the similar failed software test when applying intermittent delays during execution of the similar failed software test; and collecting pass/fail data for the similar failed software test when altering computational environment parameters of the similar failed software test; and displaying, on a graphical user interface communicatively coupled to the IDE, a graphical illustration indicating the reliability index associated with the test failure and a predicted cause of the test failure based on the predicted cause of the similar failed software test.

7. The system of claim 6, wherein the software testing repository includes a plurality of failed software tests each comprising a respective reliability index.

8. The system of claim 6, wherein the predicted cause of the test failure is a concurrency issue.

9. A computer program product comprising one or more computer readable storage media, and program instructions collectively stored on the one or more computer readable storage media, the program instructions comprising instructions configured to cause one or more processors to perform a method comprising:

receiving a test failure for a software under development in an Integrated Development Environment (IDE);

identifying, from a software testing repository communicatively coupled to the IDE, a similar failed software test;

applying a reliability index of the similar failed software test to the test failure, wherein the reliability index is based on a recency of test failures, a ratio of fail to pass test cases, a frequency of test failures, and a duration of test failures;

predicting a cause of the similar failed software test by:

collecting pass/fail data for the similar failed software test when altering an order of operations in the similar failed software test;

collecting pass/fail data for the similar failed software test when changing an operating system implementing the similar failed software test;

collecting pass/fail data for the similar failed software test when applying intermittent delays during execution of the similar failed software test; and collecting pass/fail data for the similar failed software test when altering computational environment parameters of the similar failed software test; and displaying, on a graphical user interface communicatively coupled to the IDE, a graphical illustration indicating the reliability index associated with the test failure and a predicted cause of the test failure based on the predicted cause of the similar failed software test.

10. The computer program product of claim 9, wherein the software testing repository includes a plurality of failed software tests each comprising a respective reliability index.

11. The computer program product of claim 9, wherein predicted cause of the test failure is a concurrency issue.

12. The computer-implemented method of claim 1, wherein the predicted cause of the test failure is an operating system issue.

13. The computer-implemented method of claim 1, wherein the predicted cause of the test failure is an order of operations issue.

14. The system of claim 6, wherein the predicted cause of the test failure is an operating system issue.

15. The system of claim 6, wherein the predicted cause of the test failure is an order of operations issue.

16. The computer program product of claim 9, wherein the predicted cause of the test failure is an operating system issue.

17. The computer program product of claim 9, wherein the predicted cause of the test failure is an order of operations issue.

18. The computer-implemented method of claim 1, wherein the computational environment parameters comprise Operating System (OS), timing conditions, sequencing conditions, underlying hardware, peripheral software, and firmware.

19. The system of claim 6, wherein the computational environment parameters comprise Operating System (OS), timing conditions, sequencing conditions, underlying hardware, peripheral software, and firmware.

20. The computer program product of claim 9, wherein the computational environment parameters comprise Operating System (OS), timing conditions, sequencing conditions, underlying hardware, peripheral software, and firmware.

* * * * *